US012381257B2

(12) United States Patent
Takahashi et al.

(10) Patent No.: US 12,381,257 B2
(45) Date of Patent: Aug. 5, 2025

(54) NONAQUEOUS ELECTROLYTIC SOLUTION

(71) Applicant: Central Glass Co., Ltd., Ube (JP)

(72) Inventors: Mikihiro Takahashi, Yamaguchi (JP);
Takayoshi Morinaka, Yamaguchi (JP);
Wataru Kawabata, Yamaguchi (JP)

(73) Assignee: Central Glass Co, Ltd., Ube (JP)

( * ) Notice: Subject to any disclaimer, the term of this patent is extended or adjusted under 35 U.S.C. 154(b) by 655 days.

(21) Appl. No.: 17/596,176

(22) PCT Filed: Jun. 3, 2020

(86) PCT No.: PCT/JP2020/022012
§ 371 (c)(1),
(2) Date: Dec. 3, 2021

(87) PCT Pub. No.: WO2020/246520
PCT Pub. Date: Dec. 10, 2020

(65) Prior Publication Data
US 2022/0231337 A1 Jul. 21, 2022

(30) Foreign Application Priority Data
Jun. 5, 2019 (JP) .................................. 2019-105457

(51) Int. Cl.
*H01M 10/0567* (2010.01)
*H01M 10/0568* (2010.01)
*H01M 10/0569* (2010.01)

(52) U.S. Cl.
CPC ... *H01M 10/0567* (2013.01); *H01M 10/0568* (2013.01); *H01M 10/0569* (2013.01); *H01M 2300/0028* (2013.01); *H01M 2300/0037* (2013.01)

(58) Field of Classification Search
CPC ......... H01M 10/0568; H01M 10/0567; H01M 10/0569; H01M 2300/0028; H01M 2300/0037; H01M 10/4235
See application file for complete search history.

(56) References Cited

U.S. PATENT DOCUMENTS

| 2002/0076619 | A1 | 6/2002 | Yamada et al. |
| 2011/0033749 | A1 | 2/2011 | Uchida et al. |
| 2011/0136008 | A1 | 6/2011 | Hirose et al. |
| 2012/0009476 | A1 | 1/2012 | Park et al. |
| 2014/0193706 | A1 | 7/2014 | Morinaka et al. |
| 2016/0181659 | A1 | 6/2016 | Long |
| 2018/0034103 | A1 | 2/2018 | Kubo et al. |
| 2020/0119400 | A1 | 4/2020 | Kubo et al. |
| 2020/0136186 | A1 | 4/2020 | Kubo et al. |
| 2020/0335823 | A1 | 10/2020 | Takahashi et al. |
| 2021/0184260 | A1 | 6/2021 | Takahashi et al. |

FOREIGN PATENT DOCUMENTS

| CN | 101675547 | A | 3/2010 |
| CN | 102315443 | A | 1/2012 |
| CN | 103797634 | A | 5/2014 |
| CN | 104466248 | A | 3/2015 |
| CN | 105789700 | A | 7/2016 |
| CN | 107251310 | A | 10/2017 |
| CN | 109417199 | A | 3/2019 |
| CN | 109818064 | A | 5/2019 |
| JP | 2002-134169 | A | 5/2002 |
| JP | 2005-32714 | A | 2/2005 |
| JP | 2011-124047 | A | 6/2011 |
| JP | 2014-192069 | A | 10/2014 |
| JP | 2015-64990 | A | 4/2015 |
| JP | 2019-57356 | A | 4/2019 |
| JP | 2019-102459 | A | 6/2019 |
| JP | 2019-106362 | A | 6/2019 |
| KR | 10-2019-0025693 | A | 3/2019 |
| WO | WO 2018/003992 | A1 | 1/2018 |
| WO | WO 2018/123085 | A1 | 7/2018 |

OTHER PUBLICATIONS

Chinese-language Office Action issued in Chinese Application No. 202080040324.1 dated Jan. 18, 2024, with English translation (16 pages).
Japanese-language Written Opinion (PCT/ISA/237) issued in PCT Application No. PCT/JP2020/022012 dated Aug. 18, 2020 (five (5) pages).
Extended European Search Report issued in European Application No. 20818115.6 dated May 31, 2024 (8 pages).
Chinese-language Office Action issued in Chinese Application No. 202080040324.1 dated Jul. 17, 2024 with partial English translation (17 pages).
Chinese-language Office Action issued in Chinese Application No. 202080040324.1 dated Nov. 15, 2024, with partial English translation (15 pages).
Chinese-language Office Action issued in Chinese Application No. 202080040324.1 dated Jan. 26, 2025 with English translation (21 pages).
International Search Report (PCT/ISA/210) issued in PCT Application No. PCT/JP2020/022012 dated Aug. 18, 2020 with English translation (five (5) pages).
Korean-language Office Action issued in Korean Application No. 10-2021-7039801 dated Apr. 24, 2025 with English translation (16 pages).

*Primary Examiner* — Laura Weiner
(74) *Attorney, Agent, or Firm* — Crowell & Moring LLP

(57) ABSTRACT

Provided is a nonaqueous electrolytic solution containing a nonaqueous organic solvent, a solute, a specific silicon compound (A), a specific borate (B), and a specific imide salt (C), in which $W_B/W_A$, which is a ratio of a content $W_B$ of the borate (B) based on mass to a content $W_A$ of the silicon compound (A) based on mass, is 1.5 or more and 3 or less, and $W_C/W_A$, which is a ratio of a content $W_C$ of the imide salt (C) based on mass to a content $W_A$ of the silicon compound (A) based on mass, is 1 or more and 5 or less, and the nonaqueous electrolytic solution can exhibit an effect of reducing an absolute value of internal resistance at a low temperature and an effect of improving a battery capacity after a cycle test in a well-balanced manner.

10 Claims, No Drawings

NONAQUEOUS ELECTROLYTIC SOLUTION

TECHNICAL FIELD

The present disclosure relates to a nonaqueous electrolytic solution.

BACKGROUND ART

In a battery which is an electrochemical device, in recent years, attention has been paid to a power storage system for small and high energy density applications, such as information related equipment and communication equipment, that is, a personal computer, a video camera, a digital camera, a mobile phone, and a smartphone, and a power storage system for large and power applications, such as an electric vehicle, a hybrid vehicle, an auxiliary power supply for a fuel cell vehicle, and power storage. One of the candidates is a nonaqueous electrolytic solution battery such as a lithium ion battery, which has a high energy density and a high voltage and can obtain a high capacity, and research and development have been actively conducted at present.

As a nonaqueous electrolytic, solution used in a nonaqueous electrolytic solution battery, a nonaqueous electrolytic solution, which is obtained by dissolving a fluorine-containing electrolyte such as lithium hexafluorophosphate (hereinafter, also referred to as "$LiPF_6$"), lithium bis(fluorosulfonyl)imide (hereinafter, also referred to as "LiFSI"), or lithium tetrafluoroborate (hereinafter, also referred to as "$LiBF_4$") as a solute in a solvent such as a cyclic carbonate, a chain carbonate, or an ester, is often used because the nonaqueous electrolytic solution is suitable for obtaining a battery having a high voltage and a high capacity. However, a nonaqueous electrolytic solution battery using such a nonaqueous electrolytic solution is not necessarily satisfactory in battery characteristics such as cycle characteristics and output characteristics.

For example, in the case of a lithium ion secondary battery, when lithium cations are inserted into a negative electrode at the time of initial charging, the negative electrode and the lithium cations or the negative electrode and an electrolytic solution solvent react with each other to form a coating containing lithium oxide, lithium carbonate, or lithium alkyl carbonate as a main component on a surface of the negative electrode. The coating on the surface of the electrode is called a Solid Electrolyte Interface (SEI), and the properties thereof greatly affect the battery performance, such as preventing further reductive decomposition of the solvent and preventing deterioration of the battery performance. Similarly, it is known that a coating of decomposition products is also formed on a surface of a positive electrode, which also plays an important role such as preventing oxidative decomposition of the solvent and preventing gas generation inside the battery.

In order to improve battery characteristics such as cycle characteristics and low-temperature characteristics (0° C. or lower), it is important to form a stable SEI having high ion conductivity and low electron conductivity. An attempt to positively form a good SEI by adding a small amount (usually 0.001 mass % or more and 10 mass % or less) of a compound called an additive to an electrolytic solution has been widely made.

For example, Patent Literature 1 describes an electrolytic solution containing a silicon compound having a specific structure.

CITATION LIST

Patent Literature

Patent Literature 1: JP-A-2002-134169

SUMMARY OF INVENTION

Technical Problem

However, a further improvement of the performance is required for the reduction in an absolute value of the internal resistance (also simply called "resistance") at a low temperature (0° C. or lower) or a retention rate of the battery capacity after a cycle test.

The present disclosure has been made in view of the above circumstances, and an object of the present disclosure is to provide a nonaqueous electrolytic solution that can exhibit an effect of reducing an absolute value of an internal resistance at a low temperature (0° C. or lower, for example, −20° C.) and an effect of improving a battery capacity after a cycle test in a well-balanced manner.

Solution to Problem

The present inventors have found that the object described above can be achieved by the following configuration.

<1> A nonaqueous electrolytic solution containing
   a nonaqueous organic solvent, a solute, a silicon compound (A), a borate (B), and an imide salt (C).
   wherein the silicon compound (A) is a compound represented by the following general formula (1),
   the borate (B) is a borate containing a pair of at least one cation selected from the group consisting of an alkali metal cation and an alkaline earth metal cation and at least one anion selected from the group consisting of a tetrafluoroborate anion and a difluorooxalato borate anion,
   the imide salt (C) is an imide salt represented by the following general formula (2),
   $W_B/W_A$, which is a ratio of a content $W_B$ of the borate (B) based on mass to a content $W_A$ of the silicon compound (A) based on mass, is 1.5 or more and 3 or less, and
   $W_C/W_A$, which is a ratio of a content $W_C$ of the imide salt (C) based on mass to a content $W_A$ of the silicon compound (A) based on mass, is 1 of more and 5 or less.

(1)

[$R^1$ to $R^3$ each independently represent a substituent having at least one of an unsaturated bond and an aromatic ring.]

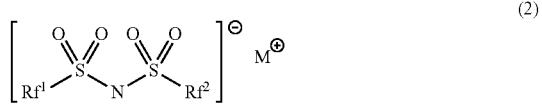

(2)

[Rf¹ and Rf² each independently represent a fluorine atom, a linear perfluoroalkyl group having 1 to 4 carbon atoms, or a branched perfluoroalkyl group having 3 to 4 carbon atoms, and M⁺ represents an alkali metal cation.]

<2> The nonaqueous electrolytic solution according to <1>, wherein the $R^1$ to $R^3$ each independently represent a group selected from the group consisting of an alkenyl group, an alkynyl group, an aryl group, an alkenyloxy group, an alkynyloxy group, and an aryloxy group.

<3> The nonaqueous electrolytic solution according to <2>, wherein the alkenyl group is a group selected from an ethenyl group and a 2-propenyl group, the alkynyl group is an ethynyl group, the aryl group is a group selected from a phenyl group, a 2-methylphenyl group, a 4-methylphenyl group, a 4-fluorophenyl group, a 4-tert-butylphenyl group, and a 4-tert-amylphenyl group, the alkenyloxy group is a group selected from a vinyloxy group and a 2-propenyloxy group, the alkynyloxy group is a propargyloxy group, and the aryloxy group is a group selected from a phenoxy group, a 2-methylphenoxy group, a 4-methylphenoxy group, a 4-fluorophenoxy group, a 4-tert-butylphenoxy group, and a 4-tert-amylphenoxy group.

<4> The nonaqueous electrolytic solution according to <1>, wherein at least two of $R^1$ to $R^3$ each independently present an ethenyl group or an ethynyl group.

<5> The nonaqueous electrolytic solution according to any one of <1> to <4>, wherein the compound represented by the general formula (1) is at least one selected from the group consisting of the following (1a) to (1q).

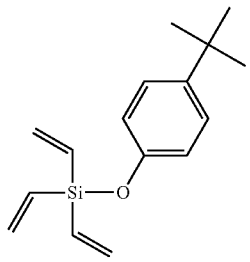
(1a)

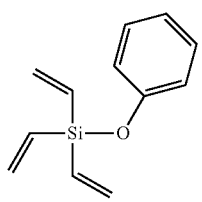
(1b)

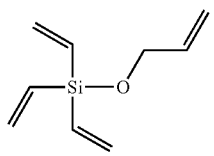
(1c)

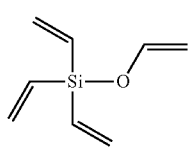
(1d)

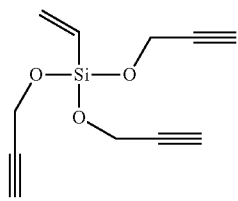
(1e)

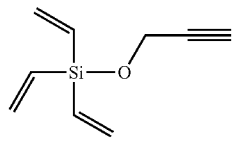
(1f)

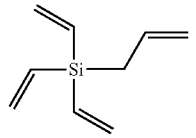
(1g)

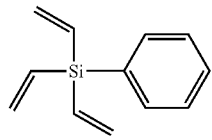
(1h)

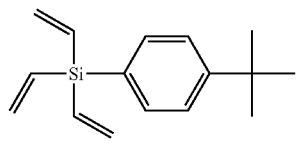
(1i)

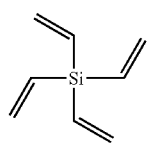
(1j)

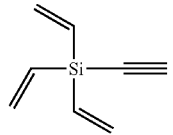
(1k)

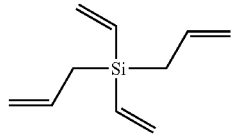
(1l)

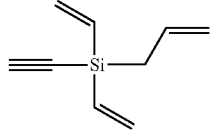
(1m)

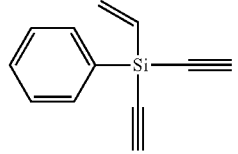
(1n)

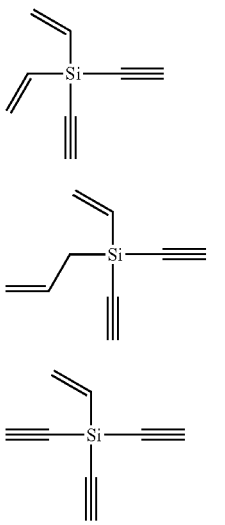

<6> The nonaqueous electrolytic solution according to <5>, wherein the compound represented by the general formula (1) is at least one selected from the group consisting of (1a), (1b), (1c) (1e), (1f), (1g), (1h), (1i), (1j), (1k), (1p), and (1q).
<7> The nonaqueous electrolytic solution according to any one of <1> to <6>, wherein the borate (B) is at least one selected from the group consisting of lithium tetrafluoroborate and lithium difluorooxalato borate.
<8> The nonaqueous electrolytic solution according to any one of <1> to <7>, wherein the imide salt (C) is lithium bis(fluorosulfonyl)imide.

Advantageous Effects of Invention

According to the present disclosure, it is possible to provide a nonaqueous electrolytic solution that can exhibit an effect of reducing an absolute value of the internal resistance at a low temperature (0° C. or lower, for example, −20° C.) and an effect of improving a battery capacity after a cycle test in a well-balanced manner.

DESCRIPTION OF EMBODIMENTS

Each configuration and a combination thereof in the following embodiments are examples, and addition, omission, replacement, and other modifications of the configuration are possible without departing from the gist of the present disclosure. The present disclosure is not limited to the embodiments.

In the present specification, the expression "to" is used to include the numerical values described therebefore and thereafter as the lower limit value and the upper limit value.

[1. Nonaqueous Electrolytic Solution]

A nonaqueous electrolytic solution according to the present disclosure contains
a nonaqueous organic solvent, a solute, a silicon compound (A), a borate (B), and an imide salt (C),
wherein the silicon compound (A) is a compound represented by the following general formula (1),
the borate (B) is a borate containing a pair of at least one cation selected from the group consisting of an alkali metal cation and an alkaline earth metal cation and at least one anion selected from the group consisting of a tetrafluoroborate anion and a difluorooxalato borate anion,
the imide salt (C) is an imide salt represented by the following general formula (2),
$W_B/W_A$, which is a ratio of a content $W_B$ of the borate (B) based on mass to a content $W_A$ of the silicon compound (A) based on mass, is 1.5 or more and 3 or less, and
$W_C/W_A$, which is a ratio of a content $W_C$ of the imide salt (C) based on mass to a content $W_A$ of the silicon compound (A) based on mass is 1 or more and 5 or less.

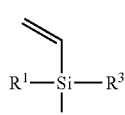

[$R^1$ to $R^3$ each independently represent a substituent having at least one of an unsaturated bond and an aromatic ring.]

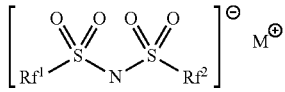

[$Rf^1$ and $Rf^2$ each independently represent a fluorine atom, a linear perfluoroalkyl group having 1 to 4 carbon atoms, or a branched perfluoroalkyl group having 3 to 4 carbon atoms, and $M^+$ represents an alkali metal cation.]

Hereinafter, each component contained in the nonaqueous electrolytic solution of the present disclosure will be described.

<Silicon Compound (A)>

The silicon compound (A) will be described. The silicon compound (A) is also referred to as component (A).

The silicon compound (A) is a compound represented by the following general formula (1).

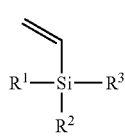

[$R^1$ to $R^3$ each independently represent a substituent having at least one of an unsaturated bond and an aromatic ring.]

The number of carbon atoms of the substituent having at least one of an unsaturated bond and an aromatic ring, which is represented by $R^1$ to $R^3$, is not particularly limited, and examples thereof include a substituent having 2 to 25 carbon atoms, which preferably has 2 to 20 carbon atoms, and more preferably 2 to 15 carbon atoms.

$R^1$ to $R^3$ are preferably a group selected from an alkenyl group, an alkynyl group, an aryl group, an alkenyloxy group, an alkynyloxy group, and an aryloxy group.

The alkenyl group is preferably a group selected from an ethenyl group and a 2-propenyl group (allyl group), and the alkynyl group is preferably an ethynyl group. The aryl group is preferably a group selected from a phenyl group, a 2-methylphenyl group, a 4-methylphenyl group, a 4-fluorophenyl group, a 4-tert-butylphenyl group, and a 4-tert-amylphenyl group.

The alkenyloxy group is preferably a group selected from a vinyloxy group and a 2-propenyloxy group (allyloxy group). The alkynyloxy group is preferably a propargyloxy group, and the aryloxy group is preferably a group selected from a phenoxy group, a 2-methylphenoxy group, a 4-methylphenoxy group, a 4-fluorophenoxy group, a 4-tert-butylphenoxy group, and a 4-tert-amylphenoxy group.

It is preferable that at least two of $R^1$ to $R^3$ each independently represent an ethenyl group or an ethynyl group, from the viewpoint of high durability improvement effect. Specific examples thereof include (1a) to (1d), (1f) to (1k), and (1m) to (among the compounds (1a) to (1q) described below.

Specifically, the compound represented by the general formula (1) is preferably at least one selected from the group consisting of the following compounds (1a) to (1q), and particularly preferably at least one selected from the group consisting of (1a), (1b), (1c), (1e), (1f), (1g), (1h), (1i), (1j), (1k), (1p), and (1q) among them, from the viewpoint of stability of the compound.

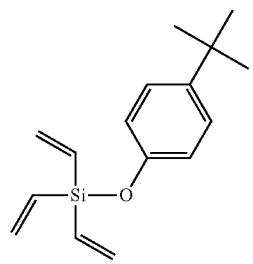
(1a)

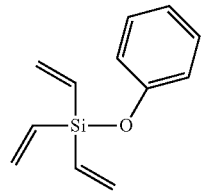
(1b)

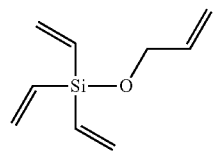
(1c)

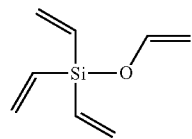
(1d)

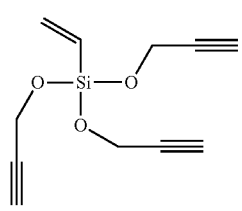
(1e)

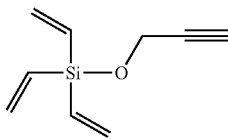
(1f)

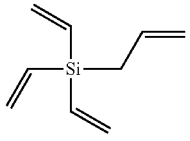
(1g)

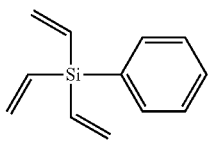
(1h)

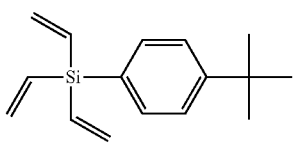
(1i)

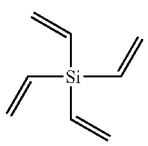
(1j)

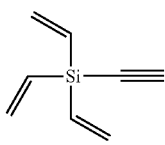
(1k)

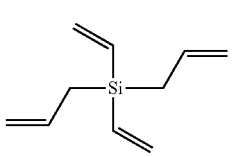
(1l)

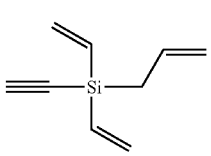
(1m)

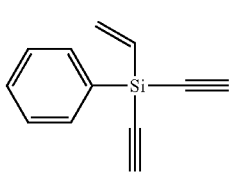
(1n)

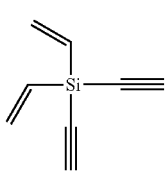
(1o)

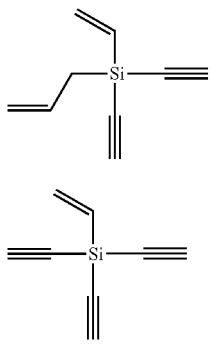

(1p)

(1q)

A suitable concentration of the silicon compound (A) with respect to the total amount of the nonaqueous electrolytic solution containing the nonaqueous organic solvent and the solute is not particularly limited, and the lower limit is generally 0.01 mass %, preferably (105 mass %, and more preferably 0.1 mass %. The upper limit is generally 3.0 mass %, preferably 2.0 mass %, and more preferably 1.0 mass %.

As the silicon compound (A), one kind may be used alone, or a plurality of kinds thereof may be used in combination.

<Borate (B)>

The borate (B) will be described. The borate (B) is also referred to as component (B).

The borate (B) is a borate containing a pair of at least one cation selected from the group consisting of an alkali metal cation and an alkaline earth metal cation and at least one anion selected from the group consisting of a tetrafluoroborate anion and a difluorooxalato borate anion.

The cation constituting the borate (B) is preferably alkali metal cations, and among the alkali metal cations, a lithium ion, a sodium ion, or a potassium ion are preferable, and the lithium ion is still more preferable.

That is, the borate (B) is preferably at least one selected from the group consisting of lithium tetrafluoroborate and lithium difluorooxalato borate, and more preferably lithium tetrafluoroborate.

A suitable concentration of the borate (B) with respect to the total amount of the nonaqueous electrolytic solution containing the nonaqueous organic solvent and the solute is not particularly limited, and the lower limit is generally 0.01 mass % or more, preferably 0.05 mass % of more, and more preferably 0.1 mass % or more. The upper limit is generally 9.0 mass % or less, preferably 6.0 mass % or less, and more preferably 3.0 mass % or less.

As the borate (B), one kind may be used alone, or a plurality of kinds thereof may be used in combination.

<Imide Salt (C)>

The imide salt (C) will be described. The imide salt (C) is also referred to as component (C).

The imide salt (C) is an imide salt represented by the following general formula (2).

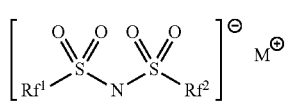

(2)

[$Rf^1$ and $Rf^2$ each independently represent a fluorine atom, a linear perfluoroalkyl group having 1 to 4 carbon atoms, or a branched perfluoroalkyl group having 3 to 4 carbon atoms, and $M^+$ represents an alkali metal cation.]

The alkali metal cation ($M^+$) constituting the imide salt (C) is more preferably a lithium ion, a sodium ion, or a potassium ion, and still more preferably a lithium ion.

The anion constituting the imide salt (C) is preferably at least one imide anion selected from the group consisting of a bis(trifluoromethanesulfonyl)imide anion, a bis(pentafluoroethanesulfonyl)imide anion, a bis(fluorosulfonyl)imide anion, and a (trifluoromethanesulfonyl)(fluorosulfonyl)imide anion.

The imide salt (C) is preferably lithium bis(fluorosulfonyl)imide.

A suitable concentration of the imide salt (C) with respect to the total amount of the nonaqueous electrolytic solution containing the nonaqueous organic solvent and the solute is not particularly limited, and the lower limit is generally 0.01 mass % or more, preferably 0.05 mass % or more, and more preferably 0.1 mass % or more. The upper limit is generally 15 mass % or less, preferably 10 mass % or less, and more preferably 5 mass % or less.

As the imide salt (C), one kind may be used alone, or a plurality of kinds thereof may be used in combination.

$W_B/W_A$, which is a ratio of a content $W_B$ of the borate (B) based on mass to a content $W_A$ of the silicon compound (A) based on mass in the nonaqueous electrolytic solution of the present disclosure, is 1.5 or more and 3 or less.

$W_C/W_A$, which is a ratio of a content $W_C$ of the imide salt (C) based on mass to the content $W_A$ of the silicon compound (A) based on mass in the nonaqueous electrolytic solution of the present disclosure, is 1 or more and 5 or less.

The $W_B/W_A$ described above is more preferably 1.7 or more and 3 or less, and particularly preferably 2 or more and 3 or less, from the viewpoint of the internal resistance at a low temperature (0° C. or lower) and a retention rate of a battery capacity after a cycle test.

The $W_C/W_A$ described above is more preferably 1.5 or more and 5 or less, and particularly preferably 2 or more and 5 or less, from the viewpoint of the internal resistance at a low temperature (0° C. or lower) and a retention rate of a battery capacity after a cycle test.

<Solute>

The solute contained in the nonaqueous electrolytic solution of the present disclosure will be described.

The solute is preferably an ionic salt, and is preferably, for example, an ionic salt containing a pair of at least one cation selected from the group consisting of an alkali metal ion and an alkaline earth metal ion and at least one anion selected from the group consisting of a hexafluorophosphate anion, a trifluoromethanesulfonate anion, a fluorosulfonate anion, a bis(difluorophosphoryl)imide anion, a (difluorophosphoryl)(fluorosulfonyl)imide anion, and a (difluorophosphoryl) (trifluoromethanesulfonyl)imide anion.

The cation of the ionic salt as the solute described above is preferably lithium, sodium, potassium, or magnesium, and the anion is preferably at least one selected from the group consisting of a hexafluorophosphate anion, a trifluoromethanesulfonate anion, a bis(difluorophosphoryl)imide anion, and a (difluorophosphoryl)(fluorosulfonyl)imide anion, from the viewpoint of high solubility in a nonaqueous organic solvent and electrochemical stability thereof.

The preferable concentration of the solute is not particularly limited, and the lower limit is generally 0.5 mol/L, or more, preferably 0.7 mol/L or more, and more preferably 0.9 mol/L or more. The upper limit is generally 2.5 mol/L, or less, preferably 2.2 mol/L or less, and more preferably 2.0 mon or less. When the concentration is 0.5 mol/L or more, it is possible to prevent a deterioration in cycle characteristics and output characteristics of a nonaqueous electrolytic solution battery due to a decrease in ion conductivity. When the concentration is 2.5 mol/L or less, it is possible to prevent a decrease in the ion conductivity and a deterioration in the cycle characteristics and the output characteristics of the nonaqueous electrolytic solution battery due to an increase in the viscosity of the nonaqueous electrolytic solution.

As the solute, one kind may be used alone, or a plurality of kinds thereof may be used in combination.

<Nonaqueous Organic Solvent>

The nonaqueous organic solvent will be described.

The type of the nonaqueous organic solvent used in the nonaqueous electrolytic solution of the present disclosure is not particularly limited, and any nonaqueous organic, solvent can be used. Specifically, the nonaqueous organic solvent is preferably at least one selected from the group consisting, of ethyl methyl carbonate (hereinafter, referred to as "EMC")dimethyl carbonate (hereinafter, referred to as "DMC"), diethyl carbonate (hereinafter, referred to as "DEC"), methyl propyl carbonate, ethyl propyl carbonate, methyl butyl carbonate, 2,2,2-trifluoroethyl methyl carbonate, 2,2,2-trifluoroethyl ethyl carbonate, 2,22-trifluoroethyl propyl carbonate, bis trifluoroethyl))carbonate, 1,1,1,3,3,3-hexafluoro-1-propyl methyl carbonate, 1,1,1,3,3,3-hexafluoro-1-propyl ethyl carbonate, 1,1,1,3,3,3-hexafluoro-1-propyl propyl carbonate, bis(1,1,1,3,3,3-hexafluoro-1-propyl)carbonate, ethylene carbonate (hereinafter, referred to as "EC"), propylene carbonate (hereinafter, referred to as "PC"), butylene carbonate, fluoroethylene carbonate (hereinafter, referred to as "FEC"), difluoroethylene carbonate, methyl acetate, ethyl acetate, methyl propionate, ethyl propionate, methyl 2-fluoropropionate, ethyl 2-fluoropropionate, diethyl ether, dibutyl ether, diisopropyl ether, 1,2-dimethoxyethane, tetrahydrofuran, 2-methyltetrahydrofuran, furan, tetrahydropyran, 1,3-dioxane, 1,4-dioxane, N,N-dimethylformamide, acetonitrile, propionitrile dimethylsulfoxide, sulfolane, γ-butyrolactone, and γ-valerolactone.

It is preferable that the nonaqueous organic solvent contains at least one selected from the group consisting of a cyclic carbonate and a chain carbonate, from the viewpoint of excellent cycle characteristics at a high temperature. It is preferable that the nonaqueous organic solvent contains an ester from the viewpoint of excellent input and output characteristics at a low temperature.

Specific examples of the cyclic carbonate include EC, PC, butylene carbonate, and FEC, and among them, at least one selected from the group consisting of EC, PC, and FEC is preferable.

Specific examples of the chain carbonate include EMC, DMC, DEC, methyl propyl carbonate, ethyl propyl carbonate, 2,2,2-trifluoroethyl methyl carbonate, 2,2,2-trifluoroethyl ethyl carbonate, 1,1,1,3,3,3-hexafluoro-1-propyl methyl carbonate, and 1,1,1,3,3,3-hexafluoro-1-propyl ethyl carbonate, and among them, at least one selected from the group consisting of EMC, DMC. DEC, and methyl propyl carbonate is preferable.

Specific examples of the ester include methyl acetate, ethyl acetate, methyl propionate, ethyl propionate, methyl 2-fluoropropionate, and ethyl 2-fluoropropionate.

The nonaqueous electrolytic solution of the present disclosure may also contain a polymer. The polymer also includes those generally called a polymer solid electrolyte. The polymer solid electrolyte also includes those containing a nonaqueous organic solvent as a plasticizer.

The polymer is not particularly limited as long as the polymer is an aprotic polymer that can dissolve the components (A) to (C), the solute, and other additives described below. Examples thereof include a polymer having polyethylene oxide in a main chain or a side chain, a homopolymer or copolymer of polyvinylidene fluoride, a methacrylic acid ester polymer, and polyacrylonitrile. When a plasticizer is added to these polymers, an aprotic nonaqueous organic solvent is preferable among the nonaqueous organic solvents described above.

<Other Additives>

As long as the gist of the present disclosure is not impaired, generally used additives may be further added to the nonaqueous electrolytic solution of the present disclosure at any ratio.

The nonaqueous electrolytic solution of the present disclosure may contain at least one of compounds represented by the following general formulae (3) to (5).

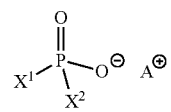

(3)

[In the general formula (3), $X^1$ and $X^2$ each independently represent a halogen atom. A represents an alkali metal cation, an ammonium ion or an organic cation.]

In the general formula (3), $X^1$ and $X^2$ each independently represent a halogen atom. Examples of the halogen atom represented by $X^1$ and $X^2$ include a fluorine atom, a chlorine atom, a bromine atom and an iodine atom, and a fluorine atom is preferable.

$X^1$ and $X^2$ may be the same or different, but are preferably the same, and both are preferably a fluorine atom.

In the general formula (3), $A^+$ represents an alkali metal cation, an ammonium ion, or an organic cation.

Examples of the alkali metal cation represented by $A^+$ include a lithium cation, a sodium cation, and a potassium cation.

$A^+$ is preferably an alkali metal cation, and more preferably a lithium cation.

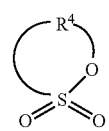

(4)

[In the general formula (4), $R^4$ represents a hydrocarbon group having 2 to 6 carbon atoms. A hetero atom may be contained between carbon-carbon atom bonds in the hydrocarbon group. Any hydrogen atom of the hydrocarbon group may be substituted with a halogen atom.]

In the general formula (4), $R^4$ represents a hydrocarbon group having 2 to 6 carbon atoms. Examples of the hydrocarbon group represented by $R^4$ include a linear or branched alkylene group, an alkenylene group, and an alkynylene group.

Specific examples of the alkylene group in the case where $R^4$ represents the alkylene group include an ethylene group, air n-propylene group, an i-propylene group, an n-butylene group, an s-butylene group, a t-butylene group, an n-pentylene group, a —CH$_2$CH(C$_3$H$_7$)— group, and an n-hexylene group.

Specific examples of the alkenylene group in the case where R$^4$ represents the alkenylene group include an ethenylene group and a propenylene group. Specific examples of the alkynylene group in the case where R$^4$ represents the alkynylene group include a propynylene group.

The hydrocarbon group represented by R$^4$ may contain a hetero atom between carbon-carbon atom bonds. Examples of the hetero atom include an oxygen atom, a nitrogen atom and a sulfur atom.

In the hydrocarbon group represented by R$^4$, any hydrogen atom may be substituted with a halogen atom. Examples of the hydrocarbon group which any hydrogen atom is substituted with a fluorine atom include a tetrafluoroethylene group, a 1,2-difluoroethylene group, a 2,2-difluoroethylene group, a fluoroethylene group, and a (trifluoromethypethylene group.

R$^4$ is preferably an unsubstituted alkylene group having 3 to 4 carbon atoms, and more preferably a propylene group.

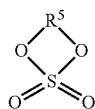

(5)

[In the general formula (5), R$^5$ represents a hydrocarbon group having 2 to 5 carbon atoms. A hetero atom may be contained between carbon-carbon atom bonds in the hydrocarbon group. Any hydrogen atom of the hydrocarbon group may be substituted with a halogen atom.]

In the general formula (5), R$^5$ represents a hydrocarbon group having, 2 to 5 carbon atoms. Examples of the hydrocarbon group represented by R$^5$ include a linear or branched alkylene group, an alkenylene group, and an alkynylene group.

Specific examples of the alkylene group in the case where represents the alkylene group include an ethylene group, an n-propylene group, an i-propylene group, an n-butylene group, an s-butylene group, a t-butylene group, an n-pentylene group, and a —CH$_2$CH(C$_3$H$_7$)— group.

Specific examples of the alkenylene group in the case where R$^5$ represents the alkenylene group include an ethenylene group and a propenylene group.

Specific examples of the alkynylene group in the case where R$^5$ represents an alkynylene group include an ethynylene group and a propynylene group.

The hydrocarbon group represented by R$^5$ may contain a hetero atom between carbon-carbon atom bonds. Examples of the hetero atom include an oxygen atom, a nitrogen atom and a sulfur atom.

In the hydrocarbon group represented by R$^5$, any hydrogen atom may be substituted with a halogen atom. Examples of the hydrocarbon group in winch any hydrogen atom is substituted with a fluorine atom include a tetrafluoroethylene group, a 1,2-difluoroethylene group, a 2,2-difluoroethylene group, a fluoroethylene group, and a (trifluoromethyl)ethylene group.

R$^5$ is preferably an unsubstituted alkylene group having 2 to 3 carbon atoms, and more preferably an ethylene group.

Specific examples of the "other additives" other than the compound represented by the general formulae (3) to (5) include compounds having an overcharge preventing effect, a negative electrode coating forming effect, and a positive electrode protecting effect, such as cyclohexylbenzene, cyclohexylfluorobenzene, fluorobenzene (hereinafter, also referred to as FB), biphenyl, difluoroanisole, tert-butylbenzene, tert-amylbenzene, 2-fluorotoluene, 2-fluorobiphenyl, vinylene carbonate, dimethylvinylene carbonate, vinylethylene carbonate, fluoroethylene carbonate, methylpropargyl carbonate, ethylpropargyl carbonate, dipropargyl carbonate, maleic anhydride, succinic anhydride, methylenemethane disulfonate, dimethylenemethanedisulfonate, trimethylenemethanedisulfonate, methylmethanesulfonate, lithium difluorobis(oxalato)phosphate (hereinafter, also referred to as LDFBOP), sodium difluorobis(oxalato)phosphate, potassium difluorobis(oxalato)phosphate, lithium bis(oxalato)borate, sodium bis(oxalato)borate, potassium bis(oxalato)borate, lithium tetrafluorooxalato phosphate (hereinafter, also referred to as LTFOP), sodium tetrafluorooxalato phosphate, potassium tetrafluorooxalato phosphate, lithium tris(oxalato)phosphate, sodium tris(oxalato)phosphate, potassium tris(oxalato)phosphate, lithium ethylfluorophosphate (hereinafter, also referred to as LEFP), lithium propylfluorophosphate, lithium fluorophosphate, ethenesulfonyl fluoride (hereinafter, also referred to as ESF), trifluoromethanesulfonyl fluoride (hereinafter, also referred to as TSF), methanesulfonyl fluoride (hereinafter, also referred to as MSF), and phenyl difluorophosphate (hereinafter, also referred to as PDFP).

The content of the other additives in the nonaqueous electrolytic solution is not particularly limited, and is preferably 0.01 mass % or more and 8.00 mass % or less with respect to the total amount of the nonaqueous electrolytic solution.

It is also preferable to contain at least one compound selected from a lithium salt of a boron complex having an oxalic acid group, a lithium salt of a phosphorus complex having an oxalic acid group, a compound having an O=S—F bond, and a compound having an O=P—F bond. It is preferable to contain the above compound from the viewpoint of not only improving the capacity retention rate after a long-term cycle at a further high temperature and preventing an increase in resistance at a low temperature after high-temperature storage, but also reducing the elution of the Ni component from the electrode into the electrolytic solution when a Ni-containing electrode is used.

It is more preferable that the lithium salt of the phosphorus complex having an oxalic acid group is at least one selected from the group consisting of lithium tetrafluorooxalato phosphate and lithium difluorobis(oxalato)phosphate, because the effect of preventing the elution of the Ni component from the positive electrode is particularly excellent in addition to the improvement of the capacity retention rate after a long-term cycle at a higher temperature and the prevention of the increase in resistance at a lower temperature after high-temperature storage.

Examples of the compound having an O=S—F bond include lithium fluorosulfonate, propyl fluorosulfate, phenyl fluorosulfate, 4-fluorophenyl fluorosulfonate, 4-tert-butylphenyl fluorosulfonate, 4-tert-amylphenyl fluorosuflonate, ethenesulfonyl fluoride, trifluoromethanesulfonyl fluoride, methanesulfonyl fluoride, benzenesulfonyl fluoride, 4-fluorophenylsulfonyl fluoride, 4-tert-butylphenylsulfonyl fluoride, 4-tert-amylphenylsulfonyl fluoride, and 2-methylphenylsulfonyl fluoride.

Examples of the compound having an O=P—F bond include lithium ethylfluorophosphate, lithium bis(difluorophosphoryl)imide, and phenyl difluorophosphate.

Further, as in the case of being used in a nonaqueous electrolytic solution battery called a polymer battery, the nonaqueous electrolytic solution can also be used after being quasi-solidified by a gelling agent or a crosslinked polymer.

The nonaqueous electrolytic solution of the present disclosure may or may not contain a compound represented by the following general formula (6). As one aspect of the nonaqueous electrolytic solution of the present disclosure, an aspect in which a content of the compound represented by the following general formula (6) is less than 0.05 mass % when the amount of the compound represented by the general formula (1) is 100 mass % can be mentioned. The nonaqueous electrolytic solution of the present disclosure may not contain the compound represented by the following general formula (6).

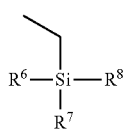

(6)

[In the general formula (6), $R^6$ to $R^8$ each independently represent a substituent having at least one of an unsaturated bond and an aromatic ring.]

The $R^6$ to $R^8$ described above are the same as the aforementioned $R^1$ to $R^3$.

<Method for Preparing Nonaqueous Electrolytic Solution>

A method for preparing the nonaqueous electrolytic solution of the present disclosure is not particularly limited. For example, the nonaqueous electrolytic solution can be prepared by dissolving the silicon compound (A), the borate (B), the imide salt (C), and the solute, in a nonaqueous organic solvent.

In the operation of dissolving the solute in the nonaqueous organic solvent, it is effective to prevent a liquid temperature of the nonaqueous organic solvent from exceeding 40° C., from the viewpoint of preventing deterioration of the nonaqueous organic solver and the solute. This is because, by setting the liquid temperature to 40° C. or lower, generation of a free acid such as hydrogen fluoride (HF) due to reaction with moisture in the system and decomposition of the solute can be prevented when the solute is dissolved, and as a result, decomposition of the nonaqueous organic solvent can also be prevented. It is also effective to add a solute little by little to perform dissolution and preparation from the viewpoint of preventing the generation of a free acid such as HF.

When dissolving the solute in the nonaqueous organic solvent, the dissolution may be performed while cooling the nonaqueous organic solvent, and the liquid temperature is not particularly limited, and is preferably −20° C. to 40° C., and more preferably 0° C. to 40° C.

When the silicon compound (A), the borate (B), the imide salt (C), and the other additives are added, the liquid temperature of the nonaqueous electrolytic solution is preferably controlled to −10° C. or higher and 40° C. or lower. The upper limit of the liquid temperature is more preferably 30° C. or lower, and particularly preferably 20° C. or lower.

The nonaqueous electrolytic solution of the present disclosure can be preferably used in a nonaqueous electrolytic solution battery (preferably, a secondary battery).

[2. Nonaqueous Electrolytic Solution Battery]

The nonaqueous electrolytic solution battery includes at least (a) the nonaqueous electrolytic solution of the present disclosure, (b) a positive electrode, and (c) a negative electrode having at least one selected from the group consisting of a negative electrode material containing a lithium metal and a negative electrode material that can occlude and release lithium, sodium, potassium, or magnesium. Furthermore, it is preferable to include (d) a separator, an exterior body, or the like.

<(b) Positive Electrode>

The (b) positive electrode preferably contains at least one oxide and/or a polyanion compound as a positive electrode active material.

[Positive Electrode Active Material]

In the case of a lithium ion secondary battery in which cations in a nonaqueous electrolytic solution are mainly lithium, the positive electrode active material constituting the (b) positive electrode is not particularly limited as long as the positive electrode active material is various chargeable and dischargeable materials, and examples thereof include (b1) a lithium transition metal composite oxide having a layered structure and containing at least one metal selected from nickel, manganese, and cobalt, (b2) a lithium manganese composite oxide having a spinel structure, (b3) a lithium-containing olivine phosphate, and (b4) a lithium-excess layered transition metal oxide having a layered halite type structure.

((b1) Lithium Transition Metal Composite Oxide)

Examples of the (b1) lithium transition metal composite oxide containing at least one metal selected from nickel, manganese, and cobalt and having a layered structure, which is an example of the positive electrode active material, include a lithium-cobalt composite oxide, a lithium-nickel composite oxide, a lithium-nickel-cobalt composite oxide, a lithium-nickel-cobalt-aluminum composite oxide, a lithium-cobalt-manganese composite oxide, a lithium-nickel-manganese composite oxide, and a lithium-nickel-manganese-cobalt composite oxide. In addition, transition metal atoms as a main component of the lithium transition metal composite oxide may be partially substituted with other elements such as Al, Ti, V, Cr, Fe, Cu, Zn, Mg, Ga, Zr, Si, B, Ba, Y, and Sn.

Specific examples of the lithium-cobalt composite oxide and the lithium-nickel composite oxide include $LiCoO_2$, $LiNiO_2$, cobaltate to which a different element such as Mg, Zr, Al, or Ti is added ($LiCo_{0.98}Mg_{0.01}Zr_{0.01}O_2$, $LiCo_{0.98}Mg_{0.01}Al_{0.01}O_2$, $LiCo_{0.975}Mg_{0.01}Zr_{0.005}Al_{0.01}O_2$, and lithium cobaltate having a rare earth compound fixed on a surface and described in WO 2014/034043. In addition, as described in JP-A-2002-151077 or the like, a $LiCoO_2$ particle powder in which a part of the particle surface is coated with aluminum oxide may be used.

The lithium-nickel-cobalt composite oxide and the lithium-nickel-cobalt-aluminum composite oxide are represented by the general formula [11].

$$Li_aNi_{1-b-c}Co_bM^{11}{}_cO_2 \quad [11]$$

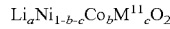

In the general formula [11], $M^{11}$ represents at least one element selected from the group consisting of Al, Fe, Mg, Zr, Ti, and B, a satisfies 0.9≤a≤1.2, and b and c satisfy the conditions of 0.1≤b≤0.3 and 0≤c≤0.1.

These can be prepared, for example, in accordance with a production method described in JP-A-2009-137834 or the like. Specific examples thereof include $LiNi_{0.8}Co_{0.2}O_2$, $LiNi_{0.85}Co_{0.10}Al_{0.05}O_2$, $LiNi_{0.87}Co_{0.10}Al_{0.03}O_2$, and $LiNi_{0.6}Co_{0.3}Al_{0.1}O_2$.

Specific examples of the lithium-cobalt-manganese composite oxide and lithium-nickel-manganese composite oxide include $LiNi_{0.5}Mn_{0.5}O_2$ and $LiCo_{0.5}Mn_{0.05}O_2$.

Examples of the lithium-nickel-manganese-cobalt composite oxide include a lithium-containing composite oxide represented by the general formula [12].

$$Li_dNi_eMn_fCo_gM^{12}{}_hO_2 \qquad [12]$$

In the general formula [12], $M^{12}$ represents at least one element selected from the group consisting of Al, Fe, Ma, Zr, Ti, B, and Sn, d satisfies $0.9 \le d \le 1.2$, and e, f, g, and h satisfy the conditions of $e+f+g+h=1$, $0 \le e \le 0.7$, $0 \le f \le 0.5$, $0 \le g \le 0.5$, and $h \ge 0$.

The lithium-nickel-manganese-cobalt composite oxide preferably contains manganese within the range shown in the general formula [12] in order to enhance the structural stability and improve the safety of the lithium secondary battery at a high temperature, and more preferably further contains cobalt within the range shown in the general formula [12] particularly in order to enhance the high-rate characteristics of the lithium ion secondary battery.

Specific examples thereof include $Li[Ni_{1/3}Mn_{1/3}Co_{1/3}]O_2$, $Li[Ni_{0.45}Mn_{0.35}Co_{0.2}]O_2$, $Li[Ni_{0.5}Mn_{0.3}Co_{0.2}]O_2$, $Li[Ni_{0.6}Mn_{0.2}Co_{0.2}]O_2$, $Li[Ni_{0.49}Mn_{0.3}Co_{0.2}Zr_{0.01}]O_2$, and $Li[Ni_{0.49}Mn_{0.3}Co_{0.2}Mg_{0.01}]O_2$, which have a charging and discharging region of 4.3V or more.

((b2) Lithium Manganese Composite Oxide Having Spinel Structure)

Examples of the (b2) lithium-manganese composite oxide having a spinel structure, which is an example of the positive electrode active material, include a spinel-type lithium-manganese composite oxide represented by the general formula [13].

$$Li_j(Mn_{2-k}M^{13}{}_k)O_4 \qquad [13]$$

In the general formula [13], $M^{13}$ represents at least one metal element selected from the group consisting of Ni, Co, Fe, Mg, Cr, Cu, Al, and Ti, j satisfies $1.05 \le j \le 1.15$, and k satisfies $0 \le k \le 0.20$.

Specific examples thereof include $LiMnO_2$, $LiMn_2O_4$, $LiMn_{1.95}Al_{0.05}O_4$, $LiMn_{1.9}Al_{0.1}O_4$, $LiMn_{1.9}Ni_{0.1}O_4$ and $LiMn_{1.5}Ni_{0.5}O_4$.

((b3) Lithium-containing Olivine Phosphate)

Examples of the (b3) lithium-containing olivine phosphate, which is an example of the positive electrode active material, include those represented by the general formula [14].

$$LiFe_{1-n}M^{14}{}_nPO_4 \qquad [14]$$

In the general formula [14], $M^{14}$ is at least one selected from Co, Ni, Mn, Cu, Zn, Nb, Mg, Al, Ti, Zr, and Cd, and n satisfies $0 \le n \le 1$.

Specific examples thereof include $LiFePO_4$, $LiCoPO_4$, $LiNiPO_4$ and $LiMnPO_4$, and among them, $LiFePO_4$ and/or $LiMnPO_4$ are preferable.

((b4) Lithium-excess Layered Transition Metal Oxide)

Examples of the (b4) lithium-excess layered transition metal oxide having a layered halite type structure, which is an example of the positive electrode active material, include those represented by the general formula [15].

$$xLiM^{15}O_2(1-x)Li_2M^{16}O_3 \qquad [15]$$

In the general formula [15], x represents a number satisfying $0 < x < 1$, $M^{15}$ represents at least one metal element having an average oxidation number of $3^+$, and $M^{16}$ represents at least one metal element having an average oxidation number of $4^+$. In the general formula [15], $M^{15}$ represents preferably one metal element selected from trivalent Mn, Ni, Co, Fe, V. and Cr, and may have an average oxidation number of trivalence with equal amounts of divalent and tetravalent metals.

In the general formula [15], $M^{16}$ represents preferably one or more metal elements selected from Mn, Zr, and Ti. Specific examples thereof include $0.5[LiNi_{0.5}Mn_{0.5}O_2]$ $0.5$ $[Li_2MnO_3]$, $0.5[LiNi_{1/3}Co_{1/3}Mn_{1/3}O_2]$ $0.5[Li_2MnO_3]$, $0.5$ $[LiNi_{0.375}Co_{0.25}Mn_{0.375}O_2]$ $0.5[Li_2MnO_3]$, $0.5$ $[LiNi_{0.375}Co_{0.125}Fe_{0.125}Mn_{0.375}O_2]$ $0.5[Li_2MnO_3]$, and $0.45$ $[LiNi_{0.375}Co_{0.25}Mn_{0.375}O_2]$ $0.10[Li_2TiO_3]$ $0.45[Li_2MnO_3]$.

There has been known that the positive electrode active material represented by the general formula [15] exhibits a high capacity by high-voltage charging of 4.4 V (based on Li) or more (for example, U.S. Pat. No. 7,135,252).

These positive electrode active materials can be prepared in accordance with, for example, production methods described in JP-A-2008-270201, WO2013/118661, JP-A-2013-030284, and the like.

The positive electrode active material contains at least one selected from (b1) to (b4) as a main component, and examples of other components include transition element chalcogenide such as $FeS_2$, $TiS_2$, $TiO_2$, $V_2O_5$, $MoO_3$, and $MoS_2$, conductive polymers such as polyacetylene, polyparaphenylene, polyaniline, and polypyrrole activated carbon, polymers that generate radicals, and carbon materials.

[Positive Electrode Current Collector]

The (b) positive electrode has a positive electrode current collector. As the positive electrode current collector, for example, aluminum, stainless steel, nickel, titanium, or an alloy thereof can be used.

[Positive Electrode Active Material Layer]

In the (b) positive electrode, for example, a positive electrode active material layer is formed on at least one surface of the positive electrode current collector. The positive electrode active material layer includes, for example, the aforementioned positive electrode active material, a binder, and, if necessary, a conductive agent. Examples of the binder include polytetrafluoroethylene, polyvinylidene fluoride, a tetrafluoroethylene-perfluoroalkyl vinyl ether copolymer, styrene-butadiene rubber (SBR), carboxymethyl cellulose, methyl cellulose, cellulose acetate phthalate, hydroxypropyl methyl cellulose, and polyvinyl alcohol.

Examples of the conductive agent include carbon materials such as acetylene black, Ketjenblack, furnace black, carbon fiber, graphite (granular graphite or flake graphite), and fluorinated graphite. In the positive electrode, acetylene black or Ketjenblack having low crystallinity is preferably used.

<(c) Negative Electrode>

The negative electrode material is not particularly limited, and in the case of a lithium battery or a lithium ion battery, a lithium metal, an alloy or an intermetallic compound of a lithium metal and another metal, various carbon materials (artificial graphite, natural graphite, etc.), a metal oxide, a metal nitride, tin (single), a tin compound, silicon (single), a silicon compound, activated carbon, a conductive polymer, and the like are used.

Examples of the carbon material include graphitizable carbon, non-graphitizable carbon (hard carbon) having a (002) plane with a plane spacing of 0.37 nm or more, and graphite having a (002) plane with a plane spacing of 0.34 nm or less. More specifically, examples thereof include pyrolytic carbon, cokes, glassy carbon fiber, an organic polymer compound fired body, activated carbon, and carbon blacks. Among them, the cokes include pitch coke, needle coke, petroleum coke, and the like. The organic polymer compound fired body is obtained by firing and carbonizing a phenol resin, a furan resin, or the like at an appropriate temperature. The carbon material is preferable because a high energy density can be obtained and excellent cycle characteristics can be obtained since a change in the crystal structure due to insertion and extraction of lithium is very small. A shape of the carbon material may be any of a fibrous shape, a spherical shape, a granular shape, and a flake-like shape. In addition, amorphous carbon or a graphite material having a surface coated with amorphous carbon is more preferable because the reactivity between the material surface and the nonaqueous electrolytic solution is decreased.

The (c) negative electrode preferably contains at least ore negative electrode active material.

[Negative Electrode Active Material]

In the case of a lithium ion secondary battery in which cations in the nonaqueous electrolytic solution are mainly lithium, the negative electrode active material constituting the (c) negative electrode can be doped and dedoped with lithium ions, and examples thereof include those containing at least one selected from (c1) a carbon material having a lattice plane 002 with a d value of 0.340 nm or less in X-ray diffraction, (c2) a carbon material having a lattice plane 002 with a d value exceeding 0.340 nm in X-ray diffraction, (c3) an oxide of one or more metals selected from Si, Sn, and Al, (c4) one or more metals selected from Si, Sn, and Al, an alloy containing these metals, or an alloy of these metals or alloys with lithium, and (c5) lithium titanium oxide. These negative electrode active materials can be used alone or in combination of two or more.

((c1) Carbon Material Having Lattice Plane 002 with d Value of 0.340 nm or Less in X-Ray Diffraction)

Examples of the (c1) carbon material having a lattice plane 002 with a d value of 0.340 nm or less in X-ray diffraction, which is an example of the negative electrode active material, include pyrolytic carbons, cokes (for example, pitch coke, needle coke, petroleum coke, etc.), graphites, organic polymer compound fired bodies (for example, those obtained by firing and carbonizing a phenol resin, a furan resin, and the like at an appropriate temperature), carbon fibers, activated carbon, and the like, and these may be graphitized. The carbon material is those having a (002) plane with a plane spacing (d002) of 0.340 nm or less as measured by an X-ray diffraction method, and among them, graphite having a true density of 1.70 g/cm$^3$ or more or a high crystalline carbon material having properties close to that of graphite is preferable.

((c2) Carbon Material Having Lattice Plane (00-Plane) 002 with d Value Exceeding 0.340 nm in X-Ray Diffraction)

Examples of the (c2) carbon material having a lattice plane 002 with a d value exceeding 0.340 nm in X-ray diffraction, which is an example of the negative electrode active material, include amorphous carbon, which is a carbon material whose stacking order hardly changes even when heat-treated at a high temperature of 2000° C. or higher. Examples thereof include non-graphitizable carbon (hard carbon), mesocarbon microbeads (MCMB) fired at 1500° C. or lower, and mesophase-pitch-based carbon fibers (MCF). Carbotron (registered trademark) P or the like manufactured by Kureha Corporation is a representative example thereof.

((c3) Oxide of One or More Metals Selected from Si, Sn, and Al)

Examples of the (c3) oxide of one or more metals selected from Si, Sn, and Al, which is an example of the negative electrode active material, include silicon oxide and tin oxide, which can be doped and dedoped with lithium ions.

There is $SiO_x$, or the like, having a structure in which ultrafine particles of Si are dispersed in $SiO_2$. When this material is used as the negative electrode active material, charging and discharging are smoothly performed since Si that reacts with Li is ultrafine particles, whereas the $SiO_x$ particles having the structure described above themselves have a small surface area, and thus the coating properties and the adhesiveness to a current collector of a negative electrode mixture layer when this material is formed as a composition (paste) for forming the negative electrode active material layer are also good.

Since $SiO_x$ has a large volume change due to charging and discharging, it is possible to achieve both high capacity and good charging and discharging cycle characteristics by using $SiO_x$ and graphite of the negative electrode active material (c1) in combination with the negative electrode active material at a specific ratio.

((c4) One or More Metals Selected from Si, Sn, and Al, Alloy Containing These Metals, or Alloy and These Metals or Alloys with Lithium)

Examples of (c4) one or more metals selected from Si, Sn, and Al, an alloy containing these metals, or an alloy of these metals or the alloys with lithium, which is an example of the negative electrode active material, include metals such as silicon, tin and aluminum, silicon alloys, tin alloys and aluminum alloys, and materials obtained by alloying these metals and the alloy with lithium during charging and discharging can also be used.

Preferable specific examples thereof include single metals (for example, powdery metals) such as silicon (Si) and tin (Sn), the metal alloys, compounds containing the metals, and alloys containing tin (Sn) and cobalt (Co) in the metals, which are described in WO 2004/100293, JP-A-2008-016424, and the like. When the metal is used for an electrode, a high charging capacity can be exhibited, and expansion and contraction of the volume due to charging and discharging are relatively small, which is preferable. When these metals are used for a negative electrode of a lithium ion secondary battery, these metals are known to exhibit high charging capacity since these metals are alloyed with Li at the time of charging, which is also preferable.

Further, for example, a negative electrode active material formed of a silicon pillar having a submicron diameter, a negative electrode active material formed of a fiber composed of silicon, and the like described in WO 2004/042851, WO 2007/083155, and the like may be used.

((c5) Lithium Titanium Oxide)

Examples of the (c5) lithium titanium oxide, which is an example of the negative electrode active material, include lithium titanate having a spinel structure and lithium titanate having a ramsdellite structure.

Examples of the lithium titanate having a spinel structure include $Li_{4+\alpha}Ti_5O_{12}$ ($\alpha$ changes within a range of $0 \leq \alpha 3$ by a charging and discharging reaction). Examples of the titanate having a ramsdellite structure include $Li_{2+\beta}Ti_3O_7$ ($\beta$ changes within a range of $0 \leq \beta \leq 3$ by a charging and discharging reaction). These negative electrode active materials can be prepared in accordance with, for example, production methods described in JP-A-2007-018883, JP-A-2009-176752, and the like.

For example, in the case of a sodium ion secondary battery in which cations in the nonaqueous electrolytic solution are mainly sodium, hard carbon and oxides such as $TiO_2V_2O_5$, and $MoO_3$ are used as the negative electrode active material. For example, in the case of a sodium ion secondary battery in which cations in a nonaqueous electrolytic solution are mainly sodium, a sodium-containing transition metal composite oxide such as $NAFeO_2$, $NaCrO_2$, $NaNiO_2$, $NaMnO_2$, and $NaCoO_2$, a mixture of a plurality of transition metals such as Fe, Cr, Ni, Mn, and Co in the sodium-containing transition metal composite oxide, the sodium-containing transition metal composite oxide in which a part of the transition metal of the sodium-containing transition metal composite oxide is replaced with a metal other than other transition metals, a phosphate compound of a transition metal such as $Na_2FeP_2O_7$ and $NaCo_3(PO_4)_2P_2O_7$, sulfides such as $TiS_2$ and $FeS_2$, conductive polymers such as poly acetylene, polyparaphenylene polyaniline, and polypyrrole, activated carbon, polymers that can generate radicals, and a carbon material is used as the positive electrode active material.

[Negative Electrode Current Collector]

The (c) negative electrode includes a negative electrode current collector. As the negative electrode current collector, for example, copper, stainless steel, nickel, titanium, or an alloy thereof can be used.

[Negative Electrode Active Material Layer]

In the (c) negative electrode, for example, a negative electrode active material layer is formed on at least one surface of the negative electrode current collector. The negative electrode active material layer includes, for example, the aforementioned negative electrode active material, a binder, and, if necessary, a conductive agent.

Examples of the binder include polytetrafluoroethylene, polyvinylidene fluoride, a tetrafluoroethylene-perfluoroalkyl vinyl ether copolymer, styrene-butadiene rubber (SBR), carboxymethyl cellulose, methyl cellulose, cellulose acetate phthalate, hydroxypropyl methyl cellulose, and polyvinyl alcohol.

Examples of the conductive agent include carbon materials such as acetylene black, Ketjenblack, furnace black, carbon fiber, graphite (granular graphite or flake graphite) and fluorinated graphite.

<Method for Producing Electrodes ((b) Positive Electrode and (c) Negative Electrode)>

The electrode can be obtained, for example, by dispersing and kneading an active material, a binder, and, if necessary, a conductive agent in a predetermined blending amount in a solvent such as N-methyl-2-pyrrolidone (NMP) or water, applying the Obtained paste to a current collector, and drying the paste to form an active material layer. The obtained electrode is preferably compressed by a method such as roll pressing to be adjusted to an electrode having an appropriate density.

Separator>

The nonaqueous electrolytic solution battery may include (d) a separator. As the separator for preventing the contact between the (b) positive electrode and the (c) negative electrode, a nonwoven fabric or a porous sheet formed of polyolefin such as polypropylene or polyethylene, cellulose, paper, glass fiber, or the like is used. These films are preferably made microporous so that the nonaqueous electrolytic solution permeates therethrough and ions easily permeate therethrough.

Examples of the polyolefin separator include a film which electrically, insulates a positive electrode and a negative electrode and through which lithium ions can pass, such as a microporous polymer film, for example, a porous polyolefin film. As a specific example of the porous polyolefin film, for example, a porous polyethylene film may be used alone or a laminate of a porous polyethylene film and a porous polypropylene film may be used as a multilayer film. In addition, examples thereof include a film obtained by combining a porous polyethylene film and a polypropylene film.

<Exterior Body>

In constituting the nonaqueous electrolytic solution battery, for example, a metal can of a coin shape, a cylindrical shape, a square shape, or the like, or a laminate exterior body can be used as an exterior body of the nonaqueous electrolytic solution battery. Examples of the metal material can include a nickel-plated steel plate, a stainless steel plate, a nickel-plated stainless steel plate, aluminum or an alloy thereof, nickel, and titanium.

As the laminate exterior body, for example, an aluminum laminate film, an SUS laminate film, a laminate film such as polypropylene or polyethylene coated with silica, or the like can be used.

The configuration of the nonaqueous electrolytic solution battery according to the present embodiment is not particularly limited, and may be a configuration in which an electrode element in which a positive electrode and a negative electrode are arranged to face each other and a nonaqueous electrolytic solution are contained in the exterior body. The shape of the nonaqueous electrolytic solution battery is not particularly limited, and an electrochemical device having a coin shape, a cylindrical shape, a square shape, an aluminum laminate sheet shape, or the like is assembled from each of the above elements.

EXAMPLE

Hereinafter, the present disclosure will be described in more detail with reference to. Examples, but the present disclosure is not limited to these descriptions.

(Preparation of Nonaqueous Electrolytic Solution No. 1-1)

A mixed solvent of ethylene carbonate, dimethyl carbonate, and ethyl methyl carbonate in a volume ratio of 2.5:4:3.5 was used as a nonaqueous organic solvent, and $LiPF_6$ was added as a solute to the solvent to have a concentration of 1.0 mol/L.

Next, the compound represented by the formula (15) as the component (A), the lithium tetrafluoroborate ($LiBF_4$) as the component (B), and the bis(fluorosulfonyl)imide lithium (LiFSI) as the component (C) were dissolved respectively such that the concentration of the component (A) was 0.3 mass %, the concentration of the component (B) was 0.5 mass %, and the concentration of the component (C) was 0.3 mass %, with respect to the total amount of the nonaqueous electrolytic solution. The above preparation was also performed while maintaining the liquid temperature within the range of 20° C. to 30° C. The preparation conditions of the nonaqueous electrolytic solution are shown in Table 1. Hereinafter, "–" in all the tables indicates that the compound is not added.

(Preparation of Nonaqueous Electrolytic Solutions Nos. 1-2 and 1-3)

Nonaqueous electrolytic solutions Nos. 1-2 and 1-3 were prepared in the same manner as in the preparation of the nonaqueous electrolytic solution No. 1-1, except that the concentrations of the components (A) to (C) were respectively changed as shown in Table 1. The preparation conditions of the nonaqueous electrolytic solution are shown in Table 1.

(Preparation of Nonaqueous Electrolytic Solutions Nos. 1-4 to 1-6)

Nonaqueous electrolytic solutions Nos. 1-4 to 1-6 were prepared in the same manner as in the preparation of the nonaqueous electrolytic solution No. 1-1, except that a compound represented by the formula (1b), (1f), or (1h) was used as the component (A) instead of the compound represented by the formula (1j), and the concentrations of the components (A) to (C) were respectively changed as shown in Table 1. The preparation conditions of the nonaqueous electrolytic solution are shown in Table 1.
(Preparation of Comparative Nonaqueous Electrolytic Solutions Nos. 1-1 and 1-2)

Comparative nonaqueous electrolytic solutions Nos. 1-1 and 1-2 were prepared in the same manner as in the preparation of the nonaqueous electrolytic solution. No. 1-1, except that the concentrations of the components (A) to (C) were respectively changed as shown in Table 1. The preparation conditions of the nonaqueous electrolytic solution are shown in Table 1.
(Preparation of Comparative Nonaqueous Electrolytic Solutions Nos. 1-3 to 1-6)

Comparative nonaqueous electrolytic solutions Nos. 1-3 to 1-6 were prepared in the same manner as in the preparation of the comparative nonaqueous electrolytic solution No. 1-1, except that a compound represented by the formula (1b) or (1f) was used as the component (A) instead of the compound represented by the formula (1j), and the concentrations of the components (A) to (C) were respectively changed as shown in Table 1. The preparation conditions of the nonaqueous electrolytic solution are shown in Table 1.
(Preparation of Comparative Nonaqueous Electrolytic. Solutions Nos. 1-7 to 1-9)

Comparative nonaqueous electrolytic solutions Nos. 1-7 to 1-9 were prepared in the same manner as in the preparation of the nonaqueous electrolytic solution. No. 1-1, except that tetrafluoroborate as the component (B) or lithium bis(fluorosulfonyl)imide as the component (C) was not added as shown in Table 1. The preparation conditions of the nonaqueous electrolytic solution are shown in Table 1.
(Preparation of Comparative Nonaqueous Electrolytic Solution No. 1-10)

A comparative nonaqueous electrolytic solution No. 1-10 was prepared in the same manner as in the preparation of the nonaqueous electrolytic solution No. 1-1, except that lithium tetrafluoroborate as the component (B) and bis(fluorosulfonyl)imide lithium as the component (C) were not added as shown in Table 1. The preparation conditions of the nonaqueous electrolytic solution are shown in Table 1.
(Preparation of Comparative Nonaqueous Electrolytic Solutions Nos. 1-11 to 1-13)

Comparative nonaqueous electrolytic solutions Nos. 1-11 to 1-13 were prepared in the same manner as in the preparation of the comparative nonaqueous electrolytic solution No. 1-10, except that a compound represented by the formula (1b), the formula (1f), or the formula (1h) was used as the component (A) instead of the compound represented by the formula (1j). The preparation conditions of the nonaqueous electrolytic solution are shown in Table 1.

The table 1 showed $W_B/W_A$, which was a ratio of the content $W_B$ of the component (B) based on mass to the content $W_A$ of the component (A) based on mass, and $W_C/W_A$, which was a ratio of the content $W_C$ of the component (C) based on mass to the content $W_A$ of the component (A) based on mass.

TABLE 1

| Nonaqueous electrolytic solution No. | Component (A) | | Component (B) | | Component (C) | | $W_B/W_A$ | $W_C/W_A$ |
|---|---|---|---|---|---|---|---|---|
| | Type | Concentration [mass %] | Type | Concentration [mass %] | Type | Concentration [mass %] | | |
| 1-1 | Formula (1j) | 0.3 | LiBF$_4$ | 0.5 | LiFSI | 0.3 | 1.7 | 1.0 |
| 1-2 | | | | 0.9 | | 1.5 | 3.0 | 5.0 |
| 1-3 | | 0.2 | | 0.4 | | 0.6 | 2.0 | 3.0 |
| 1-4 | Formula (1b) | 0.2 | | 0.4 | | 0.6 | 2.0 | 3.0 |
| 1-5 | Formula (1f) | 0.2 | | 0.4 | | 0.6 | 2.0 | 3.0 |
| 1-6 | Formula (1h) | 0.3 | | 0.5 | | 0.3 | 1.7 | 1.0 |
| Comparative 1-1 | Formula (1j) | 0.2 | LiBF$_4$ | 0.1 | LiFSI | 0.1 | 0.5 | 0.5 |
| Comparative 1-2 | | | | 1.0 | | 0.1 | 5.0 | 0.5 |
| Comparative 1-3 | Formula (1b) | 0.2 | | 0.1 | | 0.1 | 0.5 | 0.5 |
| Comparative 1-4 | | | | 1.0 | | 0.1 | 5.0 | 0.5 |
| Comparative 1-5 | Formula (1f) | 0.2 | | 0.1 | | 0.1 | 0.5 | 0.5 |
| Comparative 1-6 | | | | 1.0 | | 0.1 | 5.0 | 0.5 |
| Comparative 1-7 | Formula (1j) | 0.2 | | 0.4 | — | — | 2.0 | — |
| Comparative 1-8 | | | | 1.0 | | | 5.0 | — |
| Comparative 1-9 | Formula (1j) | 0.2 | — | — | LiFSI | 0.1 | — | 0.5 |
| Comparative 1-10 | Fonnula (1j) | 0.2 | — | — | — | — | — | — |
| Comparative 1-11 | Formula (1b) | 0.2 | | | | | — | — |
| Comparative 1-12 | Formula (1f) | 0.2 | | | | | — | — |
| Comparative 1-13 | Fetnilla (1h) | 0.2 | | | | | — | — |

(Preparation of Nonaqueous Electrolytic Solution Battery)

Using the nonaqueous electrolytic solution, a nonaqueous electrolytic solution battery. (test cell) was produced using LiNi$_{0.6}$Co$_{0.2}$Mn$_{0.2}$O$_2$ as a positive electrode material and graphite as a negative electrode material.

To 90 mass % of LiNi$_{0.6}$Co$_{0.2}$Mn$_{0.2}$O$_2$ powder, 5 mass % of polyvinylidene fluoride (hereinafter referred to as "PVDF") as a binder and 5 mass % of acetylene black as a conductive material were mixed, and N-methylpyrrolidone (hereinafter referred to as "NMP") was further added to form a paste. The paste was applied onto an aluminum foil and dried to obtain a test positive electrode body.

In addition, to 90 mass % of graphite powder, 10 mass % of PVDF as a binder was mixed, and NMP was further added to form a slurry. The slurry was applied onto a copper foil and dried at 12.0° C. for 12 hours to obtain a test negative electrode body.

Then, a nonaqueous electrolytic solution was immersed into a polyethylene separator to assemble a 50 mAh cell of an aluminum laminate exterior.

[Measurement Test of Direct Current Resistance Value (Resistance Value Evaluation at Low Temperature) after Initial Charging and Discharging]

First, the prepared cell was used to perform initial charging and discharging at an environmental temperature of 25° C. under the following conditions. That is, constant current and constant voltage charging, was performed at a charging upper limit voltage of 4.3 V and a 0.1 C rate (5 mA), and discharging was performed at a constant current of 0.2 C rate (10 mA) up to a discharging termination voltage of 3.0 V, then a charging and discharging cycle was repeated three times in which constant current and constant voltage charging was performed at a charging upper limit voltage of 4.3 V and a 0.2 C rate (10 and discharging was performed at a constant current of 0.2 C rate (10 mA) up to a discharging termination voltage of 3.0 V.

The battery of which the initial charging and discharging were completed was taken out from a charging and discharging device and a thermostatic chamber at 25° C., and then connected to an electrochemical measurement device (automatic battery evaluation device manufactured by. Electrofield. Co., Ltd.), and placed in a thermostatic chamber at −20° C. After being allowed to stand for 1 hour in this state, IV measurement was performed to determine an absolute value of the direct current resistance.

As shown in Table 2, each nonaqueous electrolytic solution was compared for each type of the component (A) used, the nonaqueous electrolytic solutions (comparative nonaqueous electrolytic solutions Nos. 1-10 to 1-13) to which the component (B) and the component (C) were not added were regarded as the reference, and an absolute value of the direct current resistance of each experimental example was expressed as a relative value when an absolute value of the reference direct current resistance was taken as 100.

[Capacity Measurement Test (Cycle Characteristic Evaluation) after 400 Cycles]

The nonaqueous electrolytic solution battery for which the measurement test of the direct current resistance value at −20° C. was completed was taken out from the electrochemical measurement device and the thermostatic chamber at −20° C., connected to the charging and discharging device, and then placed in a thermostatic chamber at 50° C. The battery was allowed to stand in this state for 2 hours, and then charged to 4.3 V at a charging rate of 2 C. After the voltage reached 4.3 V, the voltage was maintained for 1 hour, and then discharging was performed up to 3.0 V at a discharging rate of 2 C. This charging and discharging at 2 C under the environment of 50° C. was repeated 400 cycles. Then, the degree of deterioration of the battery was evaluated with the discharging capacity after 400 cycles.

As shown in Table 2, each nonaqueous electrolytic solution was compared for each type of the component (A) used, the nonaqueous electrolytic solutions (comparative nonaqueous electrolytic solutions Nos. 1-10 to 1-1) to which the component (B) and the component (C) were not added were regarded as the reference, and a value of capacity after 400 cycles of each experimental example was expressed as a relative value when a value of the reference capacity was taken as 100.

TABLE 2

| Nonaqueous electrolytic solution No. | | Resistance value evaluation at low temperature | Cycle Characteristic Evaluation |
|---|---|---|---|
| Comparative Example 1-10 (reference) | Comparative 1-10 | 100 | 100 |
| Example 1-1 | 1-1 | 100 | 102 |
| Example 1-2 | 1-2 | 95 | 105 |
| Example 1-3 | 1-3 | 96 | 100 |
| Comparative Example 1-1 | Comparative 1-1 | 99 | 100 |
| Comparative Example 1-2 | Comparative 1-2 | 93 | 94 |
| Comparative Example 1-7 | Comparative 1-7 | 96 | 97 |
| Comparative Example 1-8 | Comparative 1-8 | 94 | 93 |
| Comparative Example 1-9 | Comparative 1-9 | 100 | 100 |
| Comparative Example 1-11 (reference) | Comparative 1-11 | 100 | 100 |
| Example 1-4 | 1-4 | 96 | 101 |
| Comparative Example 1-3 | Comparative 1-3 | 100 | 100 |
| Comparative Example 1-4 | Comparative 1-4 | 93 | 93 |
| Comparative Example 1-12 (reference) | Comparative 1-12 | 100 | 100 |
| Example 1-5 | 1-5 | 96 | 101 |
| Comparative Example 1-5 | Comparative 1-5 | 100 | 100 |
| Comparative Example 1-6 | Comparative 1-6 | 93 | 94 |
| Comparative Example 1-13 (reference) | Comparative 1-13 | 100 | 100 |
| Example 1-6 | 1-6 | 100 | 102 |

From the evaluation results shown in Table 2, it was confirmed that the nonaqueous electrolytic solution batteries using the nonaqueous electrolytic solution of the present disclosure can exhibit an effect of reducing an absolute value of the internal resistance at a low temperature and an effect of improving a battery capacity after the cycle test in a well-balanced manner, as compared with the comparative examples.

INDUSTRIAL APPLICABILITY

According to the present disclosure, it is possible to provide a nonaqueous electrolytic solution that can exhibit an effect of reducing an absolute value of the internal resistance at a low temperature (0° C. or lower, for example, −20° C.) and an effect of improving a battery capacity after a cycle test in a well-balanced manner.

Although the present disclosure is described in detail with reference to specific embodiments, it will be apparent to those skilled in the art that various changes and modifications may be made without departing from the spirit and scope of the disclosure.

This application is based on a Japanese patent application filed on Jun. 5, 2019 (Japanese Patent Application No. 2019-105457), the contents of which are incorporated herein by reference.

The invention claimed is:
1. A nonaqueous electrolytic solution comprising:
a nonaqueous organic solvent;
a solute;
a silicon compound (A);
a borate (B); and
an imide salt (C), wherein
the silicon compound (A) is a compound represented by the following general formula (1),

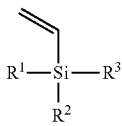
(1)

where, $R^1$ to $R^3$ each independently represent a substituent having at least one of an unsaturated bond and an aromatic ring,
the borate (B) is a borate containing a pair of at least one cation selected from the group consisting of an alkali metal cation and an alkaline earth metal cation and at least one anion selected from the group consisting of a tetrafluoroborate anion and a difluorooxalato borate anion, and the concentration of the borate (B) with respect to the total amount of the nonaqueous electrolytic solution containing the nonaqueous organic solvent and the solute is 0.01 mass % or more and 3.0 mass % or less,
the imide salt (C) is an imide salt represented by the following general formula (2),

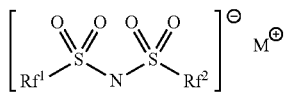
(2)

where, $Rf^1$ and $Rf^2$ each independently represent a fluorine atom, a linear perfluoroalkyl group having 1 to 4 carbon atoms, or a branched perfluoroalkyl group having 3 to 4 carbon atoms, and $M^+$ represents an alkali metal cation,
$W_B/W_A$, which is a ratio of a content $W_B$ of the borate (B) based on mass to a content $W_A$ of the silicon compound (A) based on mass, is 1.5 or more and 3 or less, and
$W_C/W_A$, which is a ratio of a content $W_C$ of the imide salt (C) based on mass to a content $W_A$ of the silicon compound (A) based on mass, is 1 or more and 5 or less.

2. The nonaqueous electrolytic solution according to claim 1, wherein the $R^1$ to $R^3$ each independently represent a group selected from the group consisting of an alkenyl group, an alkynyl group, an aryl group, an alkenyloxy group, an alkynyloxy group, and an aryloxy group.

3. The nonaqueous electrolytic solution according to claim 2,
wherein the alkenyl group is a group selected from an ethenyl group and a 2-propenyl group,
the alkynyl group is an ethynyl group,
the aryl group is a group selected from a phenyl group, a 2-methylphenyl group, a 4-methylphenyl group, a 4-fluorophenyl group, a 4-tert-butylphenyl group, and a 4-tert-amylphenyl group,
the alkenyloxy group is a group selected from a vinyloxy group and a 2-propenyloxy group,
the alkynyloxy group is a propargyloxy group, and
the aryloxy group is a group selected from a phenoxy group, a 2-methylphenoxy group, a 4-methylphenoxy group, a 4-fluorophenoxy group, a 4-tert-butylphenoxy group, and a 4-tert-amylphenoxy group.

4. The nonaqueous electrolytic solution according to claim 1, wherein at least two of $R^1$ to $R^3$ each independently represent an ethenyl group or an ethynyl group.

5. The nonaqueous electrolytic solution according to claim 1, wherein the compound represented by the general formula (1) is at least one selected from the group consisting of the following (1a) to (1q):

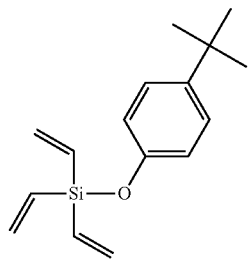
(1a)

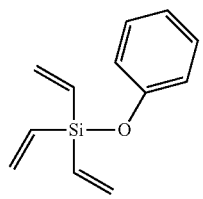
(1b)

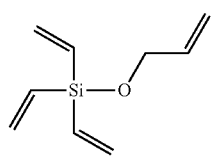
(1c)

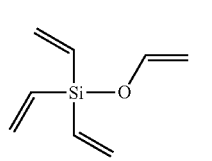
(1d)

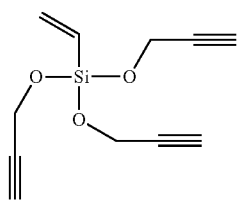
(1e)

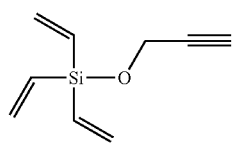
(1f)

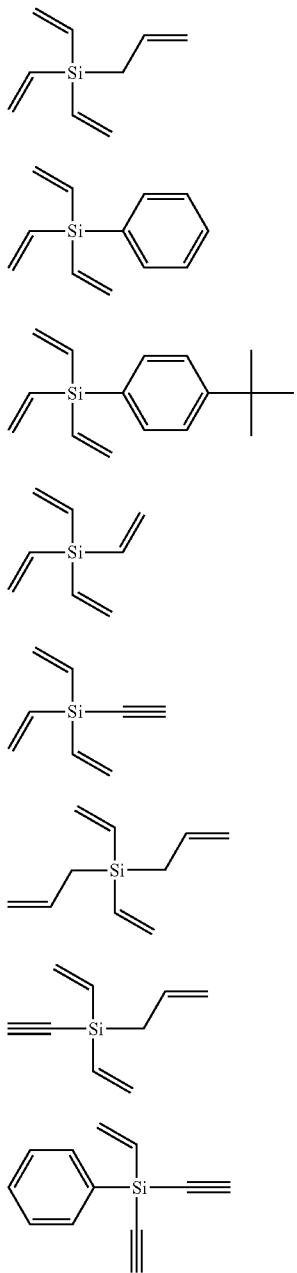
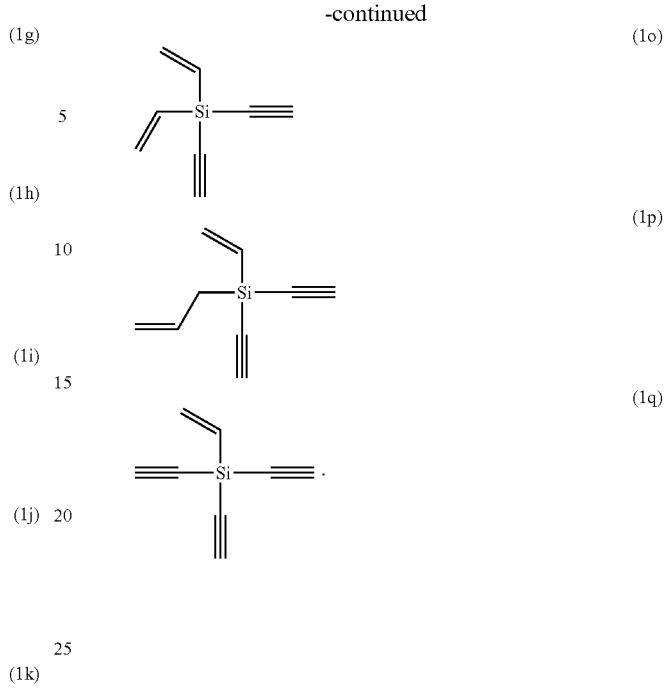

6. The nonaqueous electrolytic solution according to claim 5, wherein
the compound represented by the general formula (1) is at least one selected from the group consisting of (1a), (1b), (1c), (1e), (1f), (1g), (1h), (1i), (1j), (1k), (1p), and (1q).

7. The nonaqueous electrolytic solution according to claim 1, wherein the borate (B) is at least one selected from the group consisting of lithium tetrafluoroborate and lithium difluorooxalato borate.

8. The nonaqueous electrolytic solution according to claim 1, wherein the imide salt (C) is lithium bis(fluorosulfonyl)imide.

9. The nonaqueous electrolytic solution according to claim 1, wherein $W_B/W_A$, which is a ratio of a content $W_B$ of the borate (B) based on mass to a content $W_A$ of the silicon compound (A) based on mass, is 1.7 or more and 3 or less.

10. The nonaqueous electrolytic solution according to claim 1, wherein $W_B/W_A$, which is a ratio of a content $W_B$ of the borate (B) based on mass to a content $W_A$ of the silicon compound (A) based on mass, is 2 or more and 3 or less.

* * * * *